United States Patent
Collins et al.

(10) Patent No.: US 9,507,111 B2
(45) Date of Patent: Nov. 29, 2016

(54) OPTICAL INTERPOSER

(71) Applicant: Huawei Technologies Co., Ltd., Shenzhen (CN)

(72) Inventors: Tom Collins, Sing-Denijs (BE); Sebastien Lardenois, Brussels (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/672,851

(22) Filed: Mar. 30, 2015

(65) Prior Publication Data

US 2015/0205062 A1 Jul. 23, 2015

Related U.S. Application Data

(63) Continuation of application No. PCT/EP2013/077031, filed on Dec. 18, 2013.

(30) Foreign Application Priority Data

Dec. 19, 2012 (EP) ..................................... 12198262

(51) Int. Cl.
  *G02B 6/42* (2006.01)
  *G02B 6/34* (2006.01)
  *G02B 6/124* (2006.01)
  *G02B 6/43* (2006.01)

(52) U.S. Cl.
  CPC .............. *G02B 6/4296* (2013.01); *G02B 6/124* (2013.01); *G02B 6/34* (2013.01); *G02B 6/4204* (2013.01); *G02B 6/425* (2013.01); *G02B 6/43* (2013.01)

(58) Field of Classification Search
  None
  See application file for complete search history.

(56) References Cited

U.S. PATENT DOCUMENTS

| | | | |
|---|---|---|---|
| 6,829,286 B1 | 12/2004 | Guilfoyle et al. | |
| 9,031,365 B2* | 5/2015 | Park ........................ | H04B 10/27 385/36 |
| 2004/0156589 A1 | 8/2004 | Gunn, III et al. | |
| 2011/0075970 A1* | 3/2011 | Schrauwen ............ | G02B 6/124 385/37 |
| 2011/0133063 A1 | 6/2011 | Ji et al. | |

(Continued)

FOREIGN PATENT DOCUMENTS

| | | |
|---|---|---|
| EP | 2506370 A1 | 10/2012 |
| JP | 2004170716 A | 6/2004 |

(Continued)

OTHER PUBLICATIONS

Chang, G., et al., "Chip-to-Chip Optoelectronics SOP on Organic Boards or Packages," IEEE Transactions on Advanced Packaging, vol. 27, No. 2, May 2004, pp. 386-397.

(Continued)

*Primary Examiner* — Hemang Sanghavi
(74) *Attorney, Agent, or Firm* — Conley Rose, P.C.

(57) ABSTRACT

An optical interposer comprising an array of first order diffraction grating couplers arranged to couple light emitted by an array of single mode Vertical-Cavity Surface-Emitting Lasers (VCSELs) into optical waveguides, the light being emitted in a direction substantially perpendicular to the optical waveguides; a device for refracting the light over at least 4 degrees; an array of output ports arranged to optically couple light from the optical waveguides into an array of optical fibers or other optical elements; and the optical waveguides connecting the array of first order diffraction grating couplers and the array of output ports to route the light from the diffraction gratings into the output ports.

20 Claims, 7 Drawing Sheets

(56) References Cited

U.S. PATENT DOCUMENTS

2011/0158278 A1    6/2011  Koch
2012/0020622 A1    1/2012  Kopp et al.

FOREIGN PATENT DOCUMENTS

JP    2004309552 A    11/2004
JP    2008089879 A     4/2008
WO    2009141332 A1   11/2009

OTHER PUBLICATIONS

Chen, R., et al., "Fully Embedded Board-Level Guided-Wave Optoelectronic Interconnects," Proceedings of the IEEE, vol. 88, No. 6, Jun. 2000, pp. 780-793.

Guilfoyle, P., et al., "Highly-integrated VCSEL-based optoelectronics for fault-tolerant self-routing optical networks," Proceeding SPIE 6572, Enabling Photonics Technologies for Defense, Security and Aerospace Applications III, May 16, 2007, 2 pages.

Foreign Communication From a Counterpart Application, PCT Application No. PCT/EP2013/077031, English Translation of International Search Report dated May 2, 2014, 4 pages.

Partial English Translation and Abstract of Japanese Patent Application No. JPA2004170716, May 16, 2016, 29 pages.

Foreign Communication From a Counterpart Application, Japanese Application No. 2015-525910, Japanese Office Action dated Mar. 22, 2016, 2 pages.

Foreign Communication From a Counterpart Application, Japanese Application No. 2015-525910, English Translation of Japanese Office Action dated Mar. 22, 2016, 3 pages.

Partial English Translation and Abstract of Japanese Patent Application No. JPA2004309552, Jan. 29, 2016, 31 pages.

Partial English Translation and Abstract of Japanese Patent Application No. JPA2008089879, Jan. 29, 2016, 61 pages.

Foreign Communication From a Counterpart Application, Japanese Application No. 2015-525910, Japanese Office Action dated Dec. 1, 2015, 2 pages.

Foreign Communication From a Counterpart Application, Japanese Application No. 2015-525910, English Translation of Japanese Office Action dated Dec. 1, 2015, 2 pages.

Foreign Communication From a Counterpart Application, Japanese Application No. 2015-525910, Japanese Notice of Rejection dated Jun. 28, 2016, 2 pages.

Foreign Communication From a Counterpart Application, Japanese Application No. 2015-525910, English Translation of Japanese Notice of Rejection dated Jun. 28, 2016, 3 pages.

* cited by examiner

OPTICAL INTERPOSER

CROSS-REFERENCE TO RELATED APPLICATIONS

This application is a continuation of International Application No. PCT/EP2013/077031, filed on Dec. 18, 2013, which claims priority to European Patent Application No. EP12198262.3, filed on Dec. 19, 2012, both of which are hereby incorporated by reference in their entireties.

TECHNICAL FIELD

The present invention relates to the coupling of single mode Vertical-Cavity Surface-Emitting Lasers (VCSELs), a class of device that emits light perpendicular to a wafer's surface, to Photonic Integrated Circuits (PICs) or to optical fibers. More particularly, the invention concerns an increase in the density of single mode VCSELs in an array by use of an optical interposer.

BACKGROUND

Supercomputers and data centers are driving the need for high interconnect bandwidth as this generally results in more efficient use of microprocessors in real calculations. For distances greater than about 20 meters (m), electrical interconnects are impractical and optics are generally used for these longer rack-to-rack interconnects today. As costs of these optical interconnects come down they will take over even for board to board and eventually for on-chip interconnects. These optical interconnects, instead of running at ever increasing bit rates, tend to adopt parallel fiber architectures. This creates the need for multiple laser sources. One of the most attractive devices to meet this need is the VCSEL due to its low power consumption, small size and suitability for wafer test.

In the article "Fully Embedded Board-Level Guided-Wave Optoelectronic Interconnects" from the authors Ray T. Chen, et al., published in Proceedings of the IEEE, Vol. 88, No. 6, June 2000, an optical interconnect at board-level is described for coupling light from VCSELs into waveguides and then into silicon metal-silicon-metal (MSM) photodetectors. As is indicated in paragraph "III. Thin Film Waveguide Couplers", this article attempts to solve the problem of surface-normal 1-to-1 board level coupling into waveguides. Chen, et al. do not disclose or teach silicon-level coupling and the surface-normal or perpendicular coupling under 90 degrees investigated in this article involves substantial optical losses.

Individual VCSELs or VCSEL arrays are mounted by direct or indirect attachment of the VCSELs' substrate to another substrate containing a waveguide. The substrate may be glass, silicon, indium phosphide (InP), gallium arsenide (GaAs), etc. VCSELs are typically flip-chip mounted, i.e. the VCSELs are vertically flipped in order to present laser light to a light coupling device, e.g. a planar waveguide, a mirror, an optical detector, a diffraction grating, etc.

WO 2009/141332 discloses an integrated photonics device for coupling of light between a VCSEL and a waveguide via a diffraction grating on a silicon integrated photonic circuit. Substantial vertical coupling between VCSEL and waveguides facilitates fiber mounting and reduces packaging costs.

Other prior art solutions wherein the light of a single VCSEL is coupled into a waveguide are described in United States Patent Application 2011/133,063 and the article "Chip-to-Chip Optoelectronics SOP on Organic Boards or Packages" from the authors D. Balaraman, et al. Apart from the fact that the light from only a single VCSEL is coupled into a waveguide and the problem of density is not addressed, these prior art solutions also implement surface normal coupling, i.e. perpendicular coupling under an angle of 90 degrees involving substantial losses.

As the number of VCSELs working as multiple sources in the same system is increasing, it is desirable to scale the size of the VCSEL. In particular as reductions in the VCSEL power consumption progress (due to both the shorter distances on which they are employed and improvements in VCSEL design), coupled with more efficient ways of dissipating the heat produced, it becomes even more desirable to move to smaller VCSELs.

Unfortunately the size of VCSELs or VCSEL arrays have not to date been scalable. This is because a way must be found to couple the light from the VCSEL array into an optical fiber. VCSEL arrays are today coupled to fiber either by placing a fiber array directly above the VCSEL array or alternatively using an array of mirrors to turn the light through 90 degrees. Sometimes the end of the fiber is micro-machined and processed to integrate the mirror into the fiber tip. In most cases coupling loss is improved with an array of lenses in the optical path. In all cases the pitch of the coupling device is determined by the pitch of the fiber. Today the industry standard is 250 micrometers (um) although slightly smaller pitch is available as custom specials.

In U.S. Pat. No. 6,829,286 entitled "Resonant Cavity Enhanced VCSEL/Waveguide Grating Coupler" and in the article "Highly-Integrated, VCSEL-Based Optoelectronics for Fault-Tolerant, Self-Routing Optical Networks", the inventors/authors P. S. Guilfoyle, et al. describe an optical coupler for coupling light from an array of VCSELs into an array of optical fibers. The optical coupler from Guilfoyle, et al. comprises two mirrors (see for instance Col. 2, ln. 4, and claim 1 of U.S. Pat. No. 6,829,286) and a surface normal grating structure (see for instance Col. 2, ln. 2, FIG. 2-8, FIG. 34-35, FIG. 39-41A, claim 11 of U.S. Pat. No. 6,829,286) in the resonant cavity between the two mirrors to couple the light perpendicularly into or out of a waveguide. The optical coupler disclosed in U.S. Pat. No. 6,829,286 is rather complex since it requires two mirrors, and its coupling efficiency remains limited since it implements perpendicular coupling through a surface-normal grating structure coupling the VCSEL light into a waveguide under an angle of 90 degrees which unavoidably involves substantial losses. As is indicated in Col. 2, ln. 28-32, U.S. Pat. No. 6,829,286 also makes use of multi-mode VCSELs further reducing the efficiency since such multi-mode VCSELs are consuming excessive power.

Until relatively recently, the size of certain Integrated Circuits (ICs) were limited by the size of their bond pads. The bond wires used to connect to the IC require a minimum size bond pad and a minimum spacing to adjacent wires and they are typically located around the edge of the IC to minimize bond wire length. The advent of silicon interposers with redistribution layers and Through Silicon Vias changed this. IC's could be designed with bond pads and bumps (significantly smaller than bond pads for wire bonding) and the bond pads could be placed anywhere on the chip. The IC would then be flip-chipped onto the silicon interposer which redistributes or spreads out the signals to larger pads on the opposite side of the interposer. In this way, the size of the expensive IC is minimized.

In the same way as the size of IC's have been limited by the area required to get the electrical signals off the chip, the size of VCSEL arrays is limited by the area required to receive the light output from the VCSEL.

It is an objective of the present invention to disclose an arrangement to couple the light from an array of VCSELs into waveguides and then route the light to output ports which can be interfaced to a standard fiber array that overcomes the technical problems of the above-identified existing solutions. More particularly, it is an objective to disclose a silicon-level optical coupler between VCSELs and optical waveguides that is highly reproducible and has increased efficiency in comparison with existing solutions in terms of reduced power consumption, higher achievable density and reduced optical coupling losses.

It is another object of the present invention to disclose an improved arrangement for coupling light from multiple VCSELs arranged in arrays, emitting light perpendicular or nearly perpendicular to the plane of the chip, into waveguides integrated in the optical interposer using diffraction grating couplers.

SUMMARY

According to the present invention, the above objectives are realized by an optical interposer, the optical interposer comprising an array of first order diffraction grating couplers arranged to couple light emitted by an array of single mode VCSELs into optical waveguides, said light being emitted in a direction substantially perpendicular to said optical waveguides; a device for refracting the light over an angle of at least 4 degrees from the substantially perpendicular direction wherein the light is emitted, the device being positioned between the array of single mode VCSELs and the array of first order diffraction grating couplers; an array of output ports arranged to optically couple light from the optical waveguides into an array of optical fibers or other optical elements; and the optical waveguides coupling the array of first order diffraction grating couplers to the array of output ports to route the light from the first order diffraction gratings into the output ports.

A photonic device according to the invention integrated in a chip hence comprises a first set of photonic waveguides each connected to a first order diffraction grating coupler at one end. Multiple first order diffraction grating couplers are arranged in an array. The first order diffraction grating couplers are adapted for diffracting light that is received under an angle that deviates at least 4 degrees from the surface-normal direction into the photonic waveguides in the plane of the chip. Thanks to the use of first order gratings and the appropriate angle deviation from the perfectly normal direction, the coupling efficiency is improved significantly.

The optical interposer according to the invention further makes use of first order diffraction grating couplers to couple light from single mode VCSELs into the optical waveguides. The use of such first order diffraction grating couplers, known for instance from the article "Grating Couplers—Modern Physics at the Border Between Physics and Engineering" from author Stefan Stankowski, and single-mode VCSELs enhances the reproducibility of the optical interposer and reduces the power consumption, particularly when the signal is being sent down fibers over distances greater than 100 meters.

The first order refraction is more efficient than the surface-normal diffraction known from various prior art solutions that involves optical losses of about 50% unless mirrors and phase controlling are used. The first order refraction however requires refracting the light from the single mode VCSELs over an angle of at least 4 degrees. The exact angle depends on the design of the first order grating and can be derived from the formula given by Stefan Stankowski in the above cited article. In the optical interposer according to the invention, the refraction is achieved through an intermediate refracting device or component. One example of such a device is a wedge or prism. Alternative refracting devices are for instance a Fresnel-lens, or a lens with uniform thickness but varying effective refractive index. In a preferred embodiment of the optical interposer according to the present invention, the VCSEL light is refracted over an angle of at least 8 degrees. In another preferred embodiment, the light is refracted over an angle of at least 12 degrees.

It is noticed that the integrated photonic device according to the present invention may optionally comprise a PIC comprising one or more optical functions (passive or active) to process the light in the photonic waveguides in some way. Where appropriate, the first set of photonic waveguides will be connected to the inputs of the PIC.

The integrated photonic device according to the invention further comprises a mechanical structure which physically holds the array of VCSELs in position relative to the optical interposer, and electrical interconnects to route the driver signals, needed to drive the VCSEL array, from where they are either generated or brought onto the interposer to the VCSEL array.

The term "integrated" means that all elements comprised in the optical interposer are manufactured on the same chip.

The output ports are spaced appropriately so as to interface to an array of optical fibers.

In summary, the invention concerns a high density "optical interposer" using first order diffraction gratings for coupling the light from a dense array of single mode VCSELs into optical waveguides and then route the light to output ports that are spaced appropriately so that they can be interfaced to a standard fiber array. As the first order diffraction gratings are typically less than 20 um square, it is possible to arrange an array of first order diffraction gratings with a pitch significantly smaller than that achievable with either a fiber array or mirror arrangement as in the prior art. The array can easily be arranged in two-dimensions (2D). As a result, the array of single mode VCSELs can be very dense and yet still be interfaced with industry standard fiber arrays. Further, the use of single mode VCSELs reduces the power consumption and the use of first order diffraction gratings enhances the optical coupling efficiency. The overall structure remains simple, not requiring mirrors, phase correction, or other components that would complicate the reproducibility of the optical interposer.

Smaller single mode VCSEL arrays which, according to the invention are now easily interfaced to fiber arrays, have many advantages.

Firstly, the number of single mode VCSELs per wafer increases which makes the optical component cheaper. As III-V material and processing is expensive this can make significant differences even to overall system cost.

Secondly, there is the issue of yield which is usually area dependent as it is often material related. In an array with multiple lasers, they all have to work or the array is useless. So not only is each single mode VCSEL array on the wafer cheaper but there is a higher percentage of single mode VCSELs that will work.

Thirdly, due to a thermal expansion mismatch between silicon and III-V materials, with systems where one of these materials is flip-chipped onto the other, there is a certain maximum size before the thermal mismatch becomes an issue. Using denser arrays means that more laser sources can fit in that size.

The "optical interposer" according to the present invention can be manufactured on many different substrates. To make an efficient first order diffraction grating coupler the waveguide material and cladding material require sufficient refractive index contrast (normally greater than 20%). Typical material combinations comprise silicon/silicon dioxide, silicon nitride/silicon dioxide, silicon oxynitride/silicon dioxide, tantalum oxide/silicon dioxide, or two appropriate polymers. Those skilled in the art can devise many more combinations, as these are just some examples.

The first order diffractive grating may be raised, etched partially or etched completely through the film. In another embodiment, a reflective element may be used which is located parallel to the grating and a specific distance behind the grating (on the opposite side to the side from which the light originates) to further enhance the optical coupling efficiency.

The substrate supporting the first order diffraction grating and waveguide may also comprise an electrical interposer, e.g. to avoid issues with electrical crosstalk, or to allow three-dimensional (3D) stacking above an IC, e.g. VCSEL driver.

In a preferred embodiment of the optical interposer according to the present invention, the coupling of light from the array of output ports into the array of optical fibers or other optical elements is either "out-of-plane" or "in-plane". In other words, the output ports may be arranged vertically (or nearly vertically) or horizontally to the average plane of the chip.

Further, the output ports in the array of output ports are spaced so as to interface to respective optical fibers or other optical elements in the array of optical fibers or other optical elements. It is noticed here that there must be sufficient space between the output ports to allow the optical fibers to connect with the output ports.

In a preferred embodiment of the optical interposer according to the present invention, first order diffraction gratings in the array of first order diffraction grating couplers are spaced to interface to respective single mode VCSELs in the array of single mode VCSELs. The position of the array of single mode VCSELs is arranged relative to the optical interposer for connecting electrical signal routing. The single mode VCSELs are preferably mounted as described in Applicant's Patent Application No. EP11160547.3 "A Submount Arrangement for VCSELs" which is enclosed herein by reference.

In a preferred embodiment of the optical interposer according to the present invention, the pitch of the array of single mode VCSELs and/or the pitch of the array of optical fibers is not uniform, and/or the optical fibers in the array of optical fibers are multicore.

In another embodiment of the optical interposer according to the present invention, multiple arrays of single mode VCSELs and/or multiple arrays of optical fibers are interfaced to the interposer.

In the above, the term "and/or" between two elements means either one of the elements or both elements.

Further, the pitch of the array of single mode VCSELs is less than 250 micron.

It is possible to add additional integrated circuitry in the same chip between the single mode VCSEL array and output fibers.

Optionally, the optical interposer may comprise one or more light processing functions for coupling the light from the first order diffraction grating couplers to the output ports. As such the single mode VCSEL array may also be used as a multiple laser source for a PIC.

In one embodiment of the optical interposer according to the invention, one or more optical function is integrated between the array of first order diffraction gratings couplers and the array of output ports.

In another embodiment, one or more electrical function is integrated in the optical interposer.

In addition to an optical interposer, the invention provides a corresponding method for coupling light between an array of single mode VCSELs and an array of optical fibers or other optical elements, the method comprising coupling light emitted by the array of single mode VCSELs into an array of first order diffraction grating couplers, the light being emitted by the array of single mode VCSELs in a direction substantially perpendicular to optical waveguides coupled to the array of first order diffraction grating couplers; refracting the light between the array of single mode VCSELs and the array of first order diffraction grating couplers over an angle of at least 4 degrees from the substantially perpendicular direction wherein the light is emitted; coupling the light from the array of first order diffraction grating couplers into optical waveguides; coupling the light through the optical waveguides to an array of output ports; and coupling the light from the array of output ports into the array of optical fibers or other optical elements.

In an embodiment, the method further comprises the step of coupling the light through one or more optical function between the array of first order diffraction gratings couplers and the array of output ports.

DETAILED DESCRIPTION

Reference signs are indicated by a figure number followed by a part number. To the extent possible, each part keeps its part number throughout the different figures.

Figure 1A:
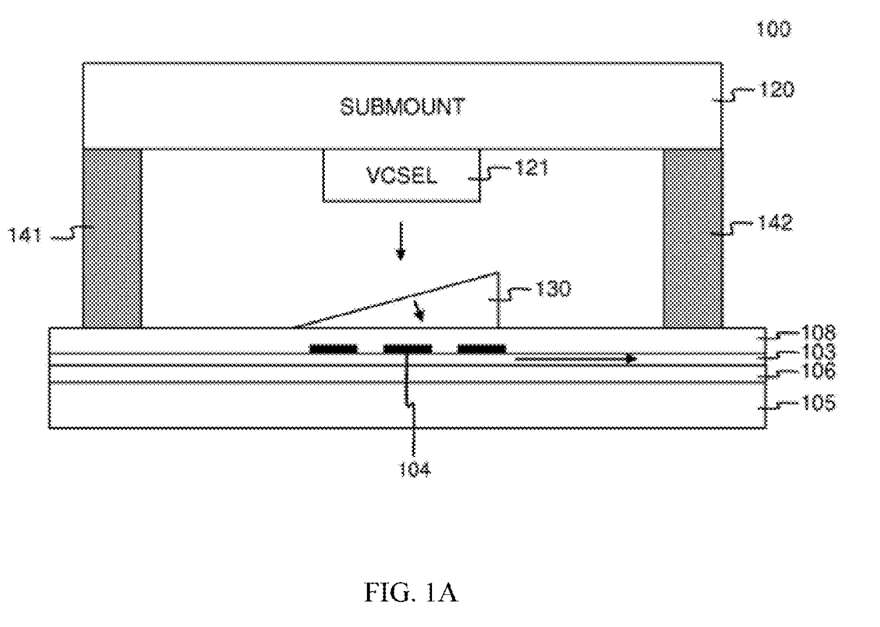
FIG. 1A illustrates a single element 100 consisting of a wedge, a first order grating and a waveguide, that forms part of an embodiment of the optical interposer according to the present invention.

FIG. 1A shows a single element 100 in an optical interposer according to the invention, this element comprising a first order diffraction grating 104, a wedge 130 for refracting light received from a single mode VCSEL 121, and an optical waveguide 103 coupling the first order diffraction grating 104 to an output port not shown in FIG. 1A but also integrated in the optical interposer. The single mode VCSEL 121 is flip-chip mounted on submount 120 supported by spacers 141 and 142. It is noticed that alternatively, the single mode VCSEL 121 may be flip-chip mounted on a submount with recess as disclosed in European Patent Application EP 2 506 370 A1 entitled "A Submount Arrangement for VCSELs" from Caliopa Nev. From bottom to top FIG. 1A shows a substrate 105, e.g. a silicon substrate, an underclad layer 106, the planar optical waveguide 103, the first order diffraction grating coupler 104, an overclad layer 108 and the light refracting wedge 130. The light refracting wedge 130 is refracting the light received from the single mode VCSEL 121 over at least 4 degrees such that the optical losses inherent to perpendicular coupling are avoided, and the first order diffractive grating 104 can couple the VCSEL light with higher efficiency into the optical waveguide 103.

Figure 1B:
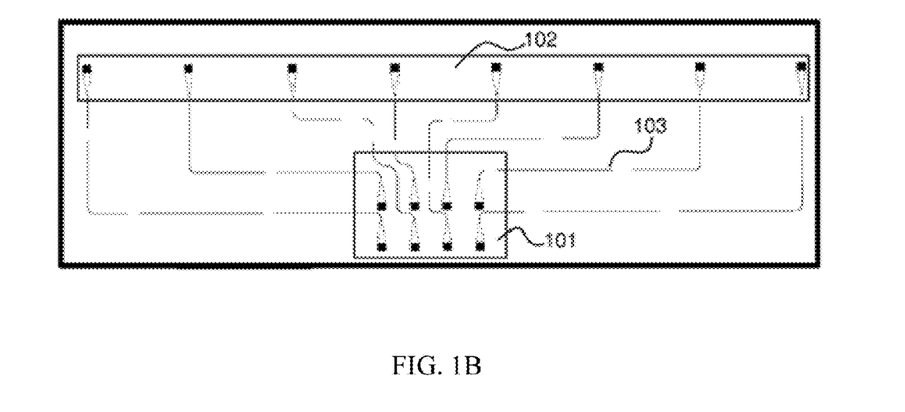
FIG. 1B illustrates a top view and FIG. 1C illustrates a 3D view of the array of first order diffraction gratings, optical waveguides and array of output ports in the embodiment of the optical interposer according to the invention of FIG. 1A wherein for clarity reasons only the optical circuit is shown.

FIG. 1B partially shows the same embodiment of the optical interposer comprising three main areas: area 101 to accept a single mode VCSEL array, area 102 to accept an optical fiber array and the optical routing 103 between the single mode VCSEL array and the optical fiber array. The array of first order diffraction grating couplers in area 101 of the optical interposer, arranged to couple light from the single mode VCSEL array, is densely spaced while the array of first order diffraction grating couplers in area 102, arranged to couple light into the fiber array, is spaced further apart. For clarity reasons, parts of the optical interposer that may be required to bring electrical signals to the single mode VCSEL array and parts required to hold the single mode VCSEL array in position are not shown in FIG. 1B.

Figure 1C:
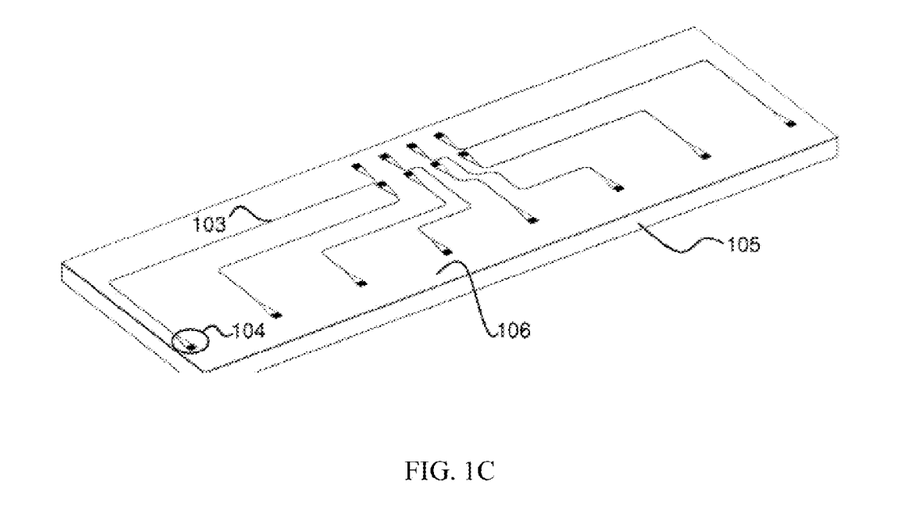

In FIG. 1C the first order diffraction gratings are labeled 104. The substrate 105 comprises an under cladding material 106 of a lower refractive index than the waveguide material of the optical routings 103. The optical interposer may optionally have an overclad material which covers the waveguide, also of a lower refractive index material than the waveguide material but not shown in FIG. 1C.

Figure 2:
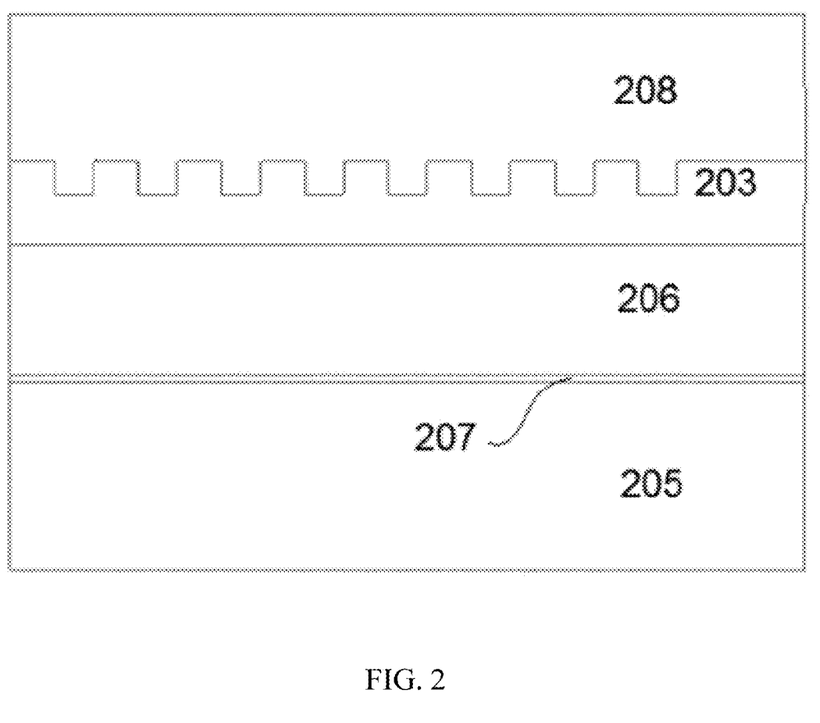
FIG. 2 illustrates a cross section of one example of a first order diffraction grating used to couple light into a waveguide in an embodiment of the optical interposer according to the invention.

FIG. 2 shows a cross section of an embodiment of the first order diffraction grating 104 of FIG. 1C. The layers are applied on top of each other as follows: a substrate 205; optionally, a reflective element 207; an under cladding layer 206 of a lower refractive index material; a waveguide layer 203 of a higher refractive index material; and optionally, an upper cladding 208 of a lower refractive index material.

The substrate 205 may be silicon, glass, ceramic, etc. The optional reflective element 207 may be a thin reflective layer or it may be a Distributed Bragg Reflector (DBR). The lower index material 206 may be silicon dioxide, polymer or any other material with a refractive index lower than the chosen waveguide material. The higher index waveguide material 203 may be silicon, polysilicon, silicon nitride, silicon oxynitride, tantalum oxide, polymer, Lithium niobate, InP, GaAs, HYDEX (a proprietary material) or any material with a refractive index higher than the chosen under cladding material.

Figure 3:
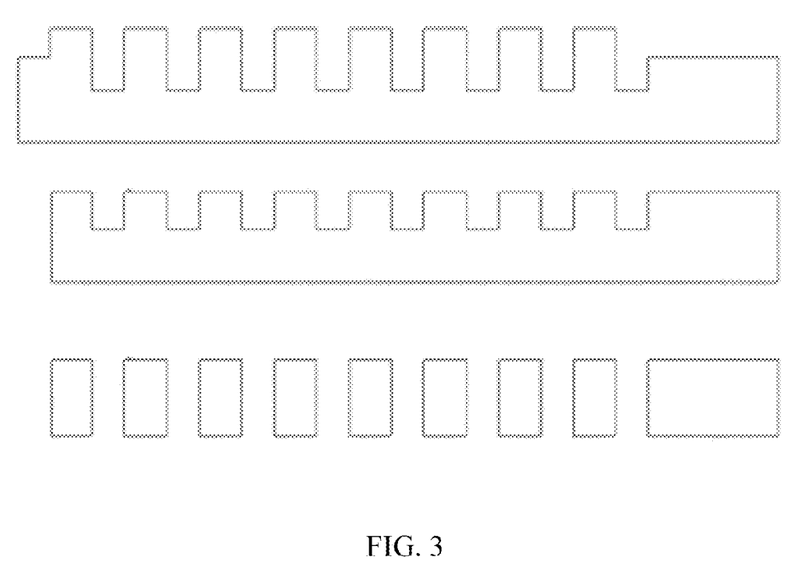
FIG. 3 illustrates a cross section of three options for designs of the higher index material part of a first order diffraction grating used in three embodiments of the optical interposer according to the invention.

FIG. 3 shows a cross section of three embodiments of the higher index material part of the first order diffraction gratings. The structures are designed so that the grating period equals the operating wavelength divided by the effective refractive index such that the Bragg condition is met for the operating wavelength at an angle close to vertical. In this way the first order mode can be efficiently coupled from out-of-plane into the waveguide or visa-versa. We hereby refer to the following diffraction grating coupler design papers: "High efficiency fiber-to-chip grating couplers realised using an advanced CMOS compatible Silicon-on-Insulator Platform", D. Vermeulen, et al., Optics Express 18917, pp. 18278-18283 (2010); "Compact focusing frating couplers for silicon-on-insulator Integrated circuits", Van Laere, et al., Photonics Technology Letters Vol 19. No 23 (2007); and "A high efficiency out-of-plane fiber coupler for coupling to high index contrast waveguides", D. Taillaert, ECOC. pp. 30-31 (2001).

Figure 4:
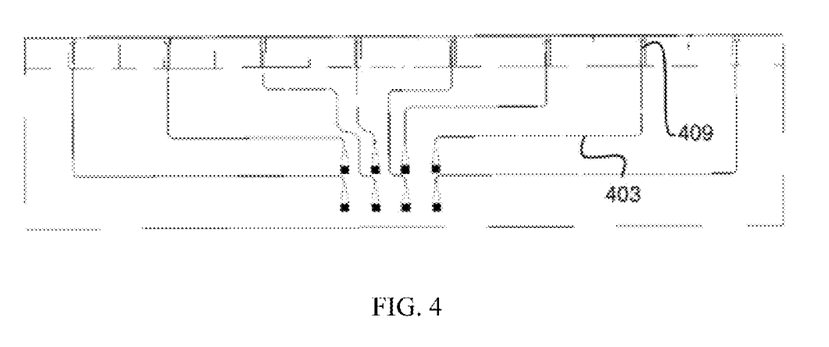
FIG. 4 illustrates a top view of an embodiment of the optical interposer according to the invention with horizontal output coupling.

FIG. 4 shows a top view of an embodiment of the optical interposer according to the invention with horizontal output couplers 409. The couplers are arranged in the plane of the waveguides 403. The fiber array is presented to the edge of the chip.

Figure 5:
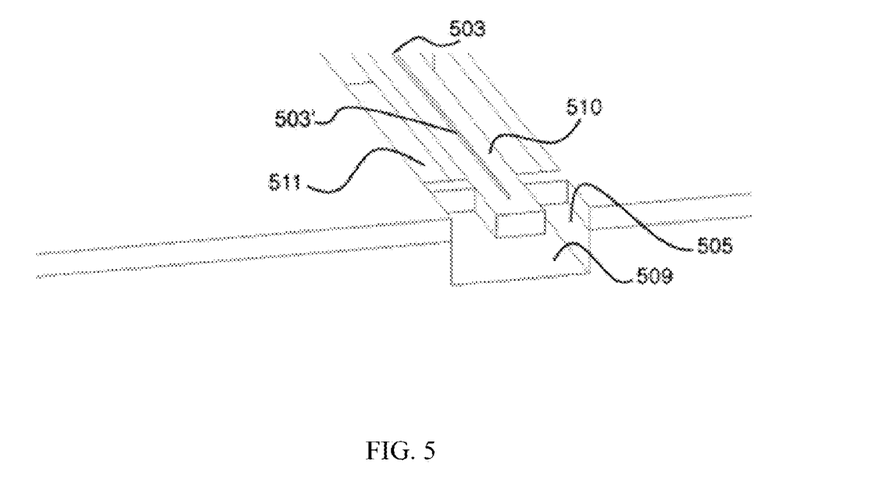
FIG. 5 illustrates a 3D view of an output coupler in an embodiment of the optical interposer according to the invention without upper cladding.

FIG. 5 shows a 3D view of the horizontal output coupler 409 of FIG. 4.

The coupler 409 consists of a cantilever 510 of a lower index cladding material. The substrate material 505 is removed around the cantilever 510. The higher index material 503 is tapered down to a thin tip 503' thereby forcing the light into the cantilever 510 where it is less well confined and the beam size is better matched to the fiber.

A cavity 511 is etched in the substrate along the cantilever 510. The cavity 511 is preferably filled with another material with a refractive index even lower than that of the cladding material. This refractive index difference and the dimensions of the cantilever 510 are designed so that the mode profile in the cantilever is well matched to the fiber where it is to be coupled to.

Figure 6:
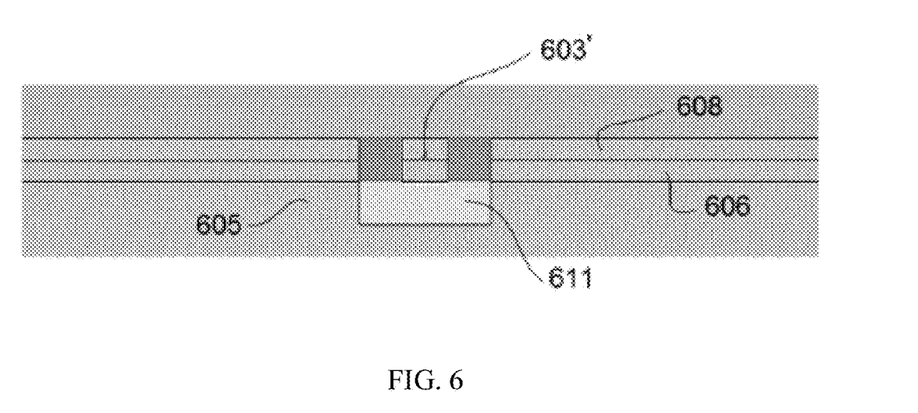
FIG. 6 illustrates a cross section through the cantilever coupler of the embodiment of FIG. 5.

FIG. 6 shows a cross section through the cantilever coupler of the embodiment of FIG. 5.

Figure 7:
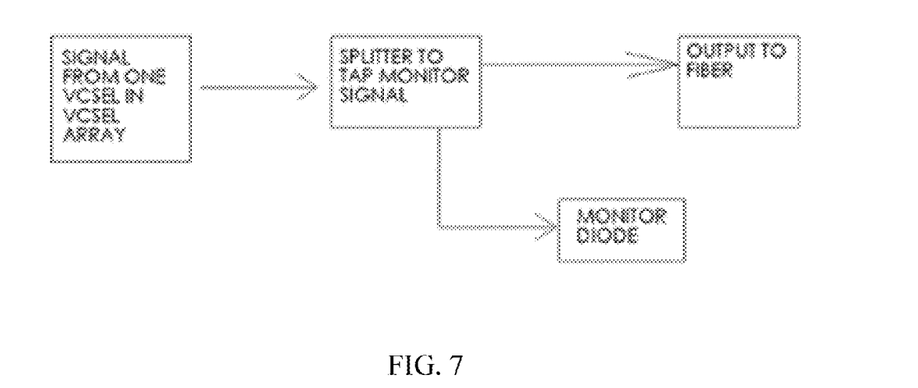
FIG. 7 is a functional diagram of an example of an optical function introduced between the input first order diffraction grating and the output coupler in an embodiment of an optical interposer according to the invention.

FIG. 7 is a functional diagram of an example of an additional optical circuitry introduced between the input diffraction grating and the output coupler.

Figure 8:
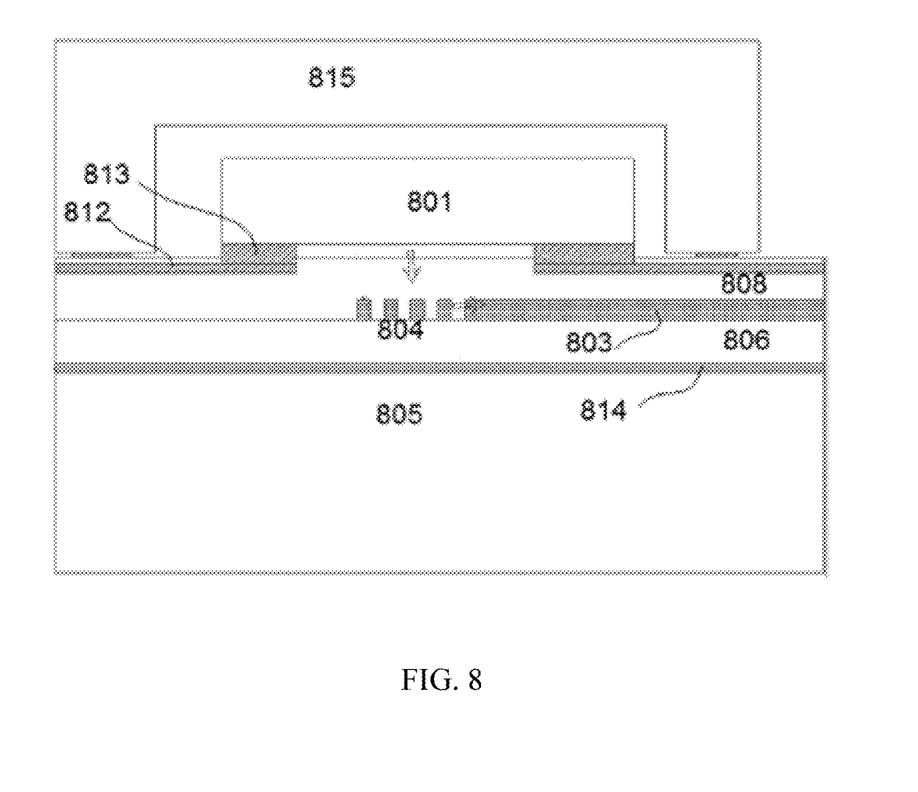
FIG. 8 illustrates a cross section of an embodiment of the optical interposer according to the invention with first order diffraction grating coupler support for the single mode VCSEL and hermetic sealing around the single mode VCSEL.

FIG. 8 shows a cross section of an embodiment of an optical interposer. Light is coupled from the VCSEL 801 in a direction perpendicular or nearly perpendicular to the plane of the chip. A refraction element not shown in FIG. 8 refracts the light over an angle of at least 4 degrees before the light reaches the first order diffraction grating coupler 804. The first order diffraction grating coupler 804 couples the light into a waveguide 803. The waveguide 803 is applied on top of an under cladding layer 806. The under cladding 806 is applied on a DBR 814, which is applied on a substrate 805. On top of the waveguide 803 an over cladding layer 808 is applied. Electrical connections 812 in the form of metal tracks and a metal bump support 813 provide electrical connectivity to the single mode VCSELs 801. A CAP 815 protects the single mode VCSEL array and creates a local hermetic sealing around the single mode VCSEL array 801.

The optical interposer may also contain e.g., structures to mechanically fix or support the single mode VCSEL array above the first order input gratings; photonic components or integrated circuits to process light in some way at some point between the input coupler and the output coupler.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. An optical interposer comprising:
    an array of first order diffraction grating couplers arranged to couple light emitted by an array of single mode Vertical-Cavity Surface-Emitting Lasers (VCSELs) into optical waveguides, wherein the light is emitted in a direction substantially perpendicular to the optical waveguides, wherein the array of first order diffraction grating couplers comprises a substrate layer, a reflective element layer, an under cladding layer, a waveguide layer, and an upper cladding layer, wherein the under cladding layer and the upper cladding layer comprise a same material, and wherein the waveguide layer has a refractive index that is greater than refractive indexes of the under cladding layer and the upper cladding layer;
    a device for refracting the light over an angle of at least four degrees from he substantially perpendicular direction, wherein the light is emitted by the array of single mode VCSELs, wherein the device is positioned between the array of single mode VCSELs and the array of first order diffraction grating couplers; and
    an array of output ports arranged to optically couple light from the optical waveguides into an array of optical fibers or other optical elements,
    wherein the optical waveguides couple the array of first order diffraction grating couplers to the array of output ports to route the light from the first order diffraction grating couplers to the output ports,
    wherein the array of single mode VCSELs comprises multiple columns and rows of single mode VCSELs,
    wherein the array of output ports comprises a single row of output ports, and
    wherein each single mode VCSEL in the array of single mode VCSELs is coupled to only one of the output ports such that no of the optical waveguides is shared by more than one of the single mode VCSELs.

2. The optical interposer according to claim 1, wherein coupling of light from the array of output ports into the array of optical fibers or other optical elements is out-of-plane.

3. The optical interposer according to claim 1, wherein coupling of light from the array of output ports into the array of optical fibers or other optical elements is in-plane.

4. The optical interposer according to claim 1, wherein output ports in the array of output ports are spaced to interface to respective optical fibers or other optical elements in the array of optical fibers or other optical elements.

5. The optical interposer according to claim 1, wherein first order diffraction grating couplers in the array of first order diffraction grating couplers are spaced to interface to respective single mode VCSELs in the array of single mode VCSELs, and wherein the position of the array of single mode VCSELs is determined relative to the optical interposer for connecting electrical signal routing.

6. The optical interposer according to claim 1, wherein the pitch of the array of single mode VCSELs is not uniform.

7. The optical interposer according to claim 1, wherein the pitch of the array of optical fibers is not uniform.

8. The optical interposer according to claim 1, wherein optical fibers in the array of optical fibers are multicore.

9. The optical interposer according to claim 1, wherein multiple arrays of single mode VCSELs are interfaced to the optical interposer.

10. The optical interposer according to claim 1, wherein multiple arrays of optical fibers are interfaced to the optical interposer.

11. The optical interposer according to claim 1, wherein the pitch of the array of single mode VCSELS is less than 250 micron.

12. The optical interposer according to claim 1, further comprising one or more optical functions between the array of first order diffraction gratings couplers and the array of output ports.

13. The optical interposer according to claim 1, further comprising electrical functions.

14. A method for coupling light between an array of single mode Vertical-Cavity Surface-Emitting Lasers (VCSELs) and an array of optical fibers or other optical elements, the method comprising:
    coupling light emitted by the array of single mode VCSELs into an array of first order diffraction grating couplers, wherein the light is emitted by the array of single mode VCSELs in a direction substantially perpendicular to optical waveguides coupled to the array of first order diffraction grating couplers, wherein the array of first order diffraction grating couplers comprises a substrate layer, a reflective element layer, an under cladding layer, a waveguide layer, and an upper cladding layer, wherein the under cladding layer and the upper cladding layer comprise a same material, and wherein the waveguide layer has a refractive index, that is greater than refractive indexes of the under cladding layer and the upper cladding layer;
    refracting the light between the array of single mode VCSELs and the array of first order diffraction grating couplers over an angle of at least 4 degrees from substantially perpendicular direction wherein the light is emitted;

coupling the light from the array of first order diffraction grating couplers into optical waveguides;

coupling light through the optical waveguides to an array of output ports; and coupling light from the array of output ports into the array of optical fibers or other optical elements, wherein the array of single mode VCSELs comprises multiple columns and rows of single mode VCSELs, wherein the array of output ports comprises a single row of output ports, and wherein each single mode VCSEL in the array of single mode VCSELs is coupled to only one of the output ports such that none of the optical waveguides is shared by more than one of the single mode VCSELs.

15. The method according to claim 14, further comprising coupling the light through one or more optical functions between the array of first order diffraction gratings couplers and the array of output ports.

16. The optical interposer according to claim 1, wherein the array of first order diffraction grating couplers has a grating period that equals an operating wavelength of the VCSELs divided by an effective refractive index of the array of first order diffraction grating couplers.

17. The optical interposer according to claim 1, wherein the reflective layer is between the substrate layer and the under cladding layer, and wherein the waveguide is between the under cladding layer and the upper cladding layer.

18. The optical interposer according to claim 17, wherein the substrate layer comprises silicon, glass, or ceramic.

19. The optical interposer according to claim 18, wherein the under cladding layer and the upper cladding layer comprise silicon dioxide or polymer.

20. The optical interposer according to claim 19, wherein the waveguide layer comprises silicon, polysilicon, silicon nitride, silicon oxynitride, tantalum oxide, polymer, or lithium niobate.

* * * * *